United States Patent [19]

Sewell

[11] Patent Number: 4,937,034

[45] Date of Patent: Jun. 26, 1990

[54] APPARATUS AND METHOD FOR COFEEDING ADDITIVES WITH POLYMER FLAKE

[75] Inventor: William J. Sewell, Seaford, Del.

[73] Assignee: E. I. Du Pont de Nemours and Company, Wilmington, Del.

[21] Appl. No.: 345,630

[22] Filed: Apr. 3, 1989

[51] Int. Cl.$^5$ ................................................ B29C 47/10
[52] U.S. Cl. .................................... 264/349; 264/85;
264/211.21; 264/211.22; 264/211.23; 366/75;
366/76; 366/178; 425/205; 425/209; 425/376.1
[58] Field of Search ............ 264/349, 211.21, 211.22,
264/211.23, 85, 140–143; 425/205–209, 376.1;
366/75, 76, 178

[56] References Cited

U.S. PATENT DOCUMENTS

| | | | |
|---|---|---|---|
| 3,148,412 | 9/1964 | Spreeuwers | 264/349 |
| 3,353,974 | 11/1967 | Trimble et al. | 264/349 |
| 3,477,698 | 11/1969 | Smith et al. | 425/587 |
| 3,673,147 | 6/1972 | Bor | 264/140 |
| 3,969,312 | 7/1976 | Lees | 264/78 |
| 3,972,665 | 8/1976 | Andrews | 425/209 |
| 4,353,851 | 10/1982 | Godfrey et al. | 264/141 |
| 4,684,488 | 8/1987 | Rudolph | 264/211.23 |
| 4,728,475 | 3/1988 | Beck | 425/207 |

FOREIGN PATENT DOCUMENTS

| | | | |
|---|---|---|---|
| 3600566 | 7/1987 | Fed. Rep. of Germany | 425/580 |
| 54-38358 | 3/1979 | Japan | 264/211.21 |
| 57-93118 | 6/1982 | Japan | 264/349 |

Primary Examiner—Jeffery Thurlow

[57] ABSTRACT

A method and apparatus for cofeeding additive concentrates in the form of pellets with a polymer flake stream flowing in a supply chute to a melt extruder. The pellets are introduced through an opening in the chute which is covered by an umbrella-like housing that has an opening facing the melt extruder. The flake flows around the umbrella-like housing creating a pocket to provide unimpeded entry of the pellets into the polymer stream.

4 Claims, 2 Drawing Sheets

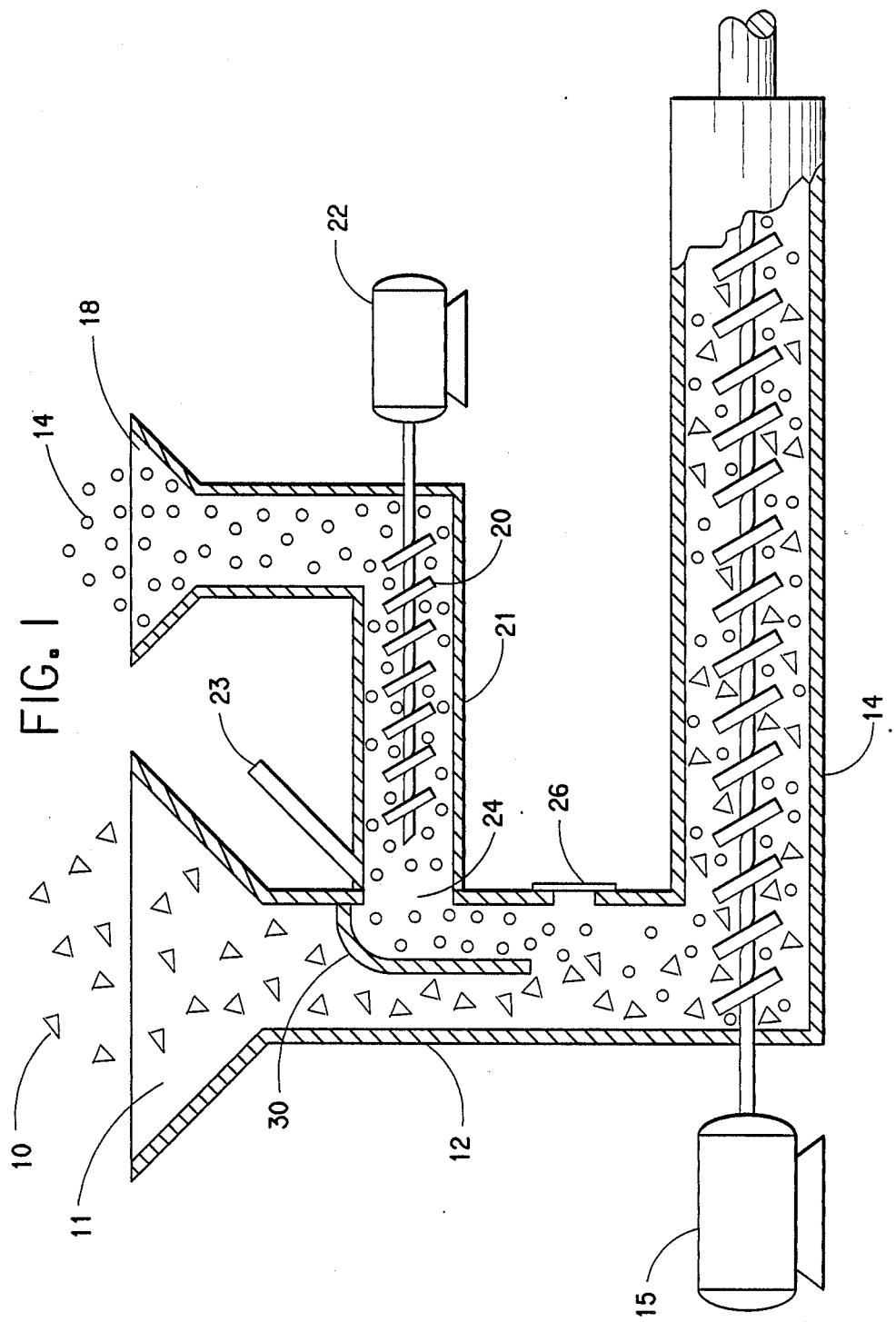
FIG. I

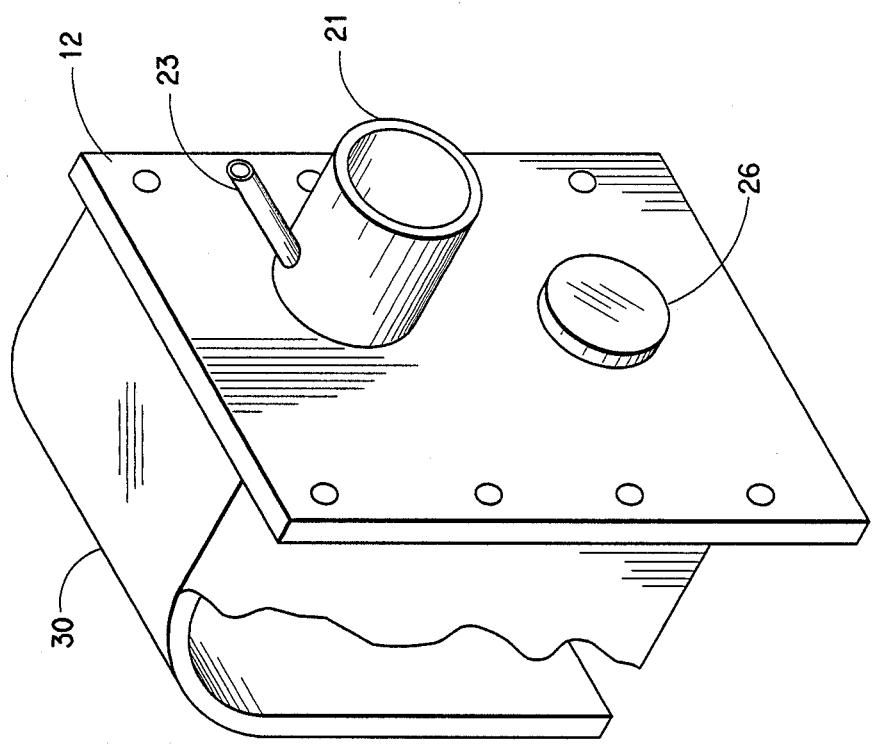

APPARATUS AND METHOD FOR COFEEDING ADDITIVES WITH POLYMER FLAKE

BACKGROUND

This invention relates generally to an apparatus and process for the introduction of additives into a polymer flake flow stream. More particularly, it relates to the uniform introduction of additives to the polymer flake prior to its being processed in a melt extruder.

Thermoplastic polymers are often treated with additives in the molten state by the addition of additive concentrates. Such concentrates are concentrated dispersions of an additive in a carrier polymer, the carrier polymer being either the same as or compatible with the polymer to be treated. There are several known methods for adding a concentrate to a thermoplastic polymer.

One method is to meter a pelletized concentrate into the throat of a polymer extruder using either volumetric or gravimetric pellet feeders.

SUMMARY OF THE INVENTION

This invention provides an improved process for adding additive concentrates to thermoplastic polymers being processed in screw-melter extruders. The method involves introducing additive concentrate in the form of pellets through an opening into a vertically oriented flake supply chute that supplies polymer flake flowing in a stream to the feed zone of an extruder, then shielding the pellets from the polymer flake stream to provide unimpeded entry of the pellets into the polymer flake stream. A housing with an opening directed toward the extruder's feed zone encloses the opening in the polymer flake chute.

BRIEF DESCRIPTION OF THE DRAWINGS

FIG. 1 is a schematic diagram that illustrates a process for metering additive concentrates into a screw-melter extruder using the housing of FIG. 2.

FIG. 2 is a schematic perspective view of a housing suitable for use in the transition chute of a melt extruder for practicing the method of this invention.

DETAILED DESCRIPTION OF THE ILLUSTRATED EMBODIMENTS

In accordance with this invention, pellets of additive concentrate are metered through an opening into the main flake supply chute supplying the feed zone of a screw-melter polymer extruder. An umbrella type housing is positioned over the opening through which the pellets of additive concentrate are fed to the flake supply chute. These pellets are mixed within the extruder with a thermoplastic polymer to be colored and this mixture is then melted and extruded into a useful article, for example, a fiber for textile or carpeting end-use.

Screw-melter polymer extruders useful in this invention are of the single type. These extruders typically have a barrel housing with a rotatable screw longitudinally positioned therein for the purpose of moving a thermoplastic polymer flake or pellet from the feed zone into the melting zone of the extruder. The screw comprises a shaft rotatably mounted longitudinally within the housing and having a flight positioned spirally about and projecting from the surface of the shaft to a location close to the wall of the barrel housing. In operation the flight wipes the inner surface of the barrel. In accordance with this invention, additive concentrate in pellet form is fed horizontally through an opening in the flake supply chute by means of a feed screw into an umbrella-like housing positioned over the opening to initially shield the pellets from the flake supply stream flowing downwardly through the supply chute, thus creating a pocket for the pellets to permit unimpeded entry of the pellets into the flake stream.

Referring now to the drawings, a thermoplastic polymer flake 10 is loaded into the inlet 11 of a vertically oriented flake supply chute 12 which flood feeds the feed zone of a conventional single-screw screw-melter extruder 14 driven by motor 15. Chute 12 is defined by sidewalls 12a. An additive such as a color concentrate in the form of pellets 16 is loaded into hopper 18 which flood feeds feed screw 20 driven by motor 22. The housing 21 of the feed screw 20 is attached to an opening 24 in the supply chute which is located in sidewall 12a between the inlet and the outlet of the chute 12 connected to the extruder. A sight glass 26 is located below opening 24. A housing 30 attached to flake chute 12 encloses opening 24. The housing extends into the flake supply chute and has a single opening 32 directed toward the feed zone of the screw melter feed zone. Pipe 23 is an inlet for inert gas used to blanket the flake.

In operation, the flake 10 flows around the sides of the umbrella-like housing 30 creating a pocket to provide an unimpeded entry of the pellets 16 into the flake supply stream. This in turn allows for uniform mixing and dispersion of the pellets.

What is claimed:

1. In an apparatus for supplying polymer flake to a melt extruder that includes a vertically oriented flake supply chute defined by sidewalls and having inlet and outlet ends with the outlet end being attached to the feed zone of the extruder, the improvement of which comprises:

means for supplying an additive in the form of pellets horizontally into the flake supply chute through a sidewall opening located between the inlet and outlet ends of the flake supply chute and a housing enclosing said opening, said housing extending into said flake supply chute and having a single opening directed toward said feed zone.

2. The apparatus of claim 1 wherein said means for supplying the pellets is a driven screw associated with said opening located between the inlet and outlet ends of the flake supply chute.

3. A method for blending an additive in the form of pellets with polymer flake flowing downwardly in a stream in a vertically oriented flake supply chute to a feed zone of a screw-melter extruder, said method comprising: introducing said pellets horizontally into said chute; shielding said pellets, as they are introduced, from the downwardly flowing polymer flake stream to permit unimpeded entry of the pellets into the polymer flake stream.

4. The method as defined in claim 3 wherein the additive is a color concentrate.

* * * * *